United States Patent [19]

Daniels, Jr.

[11] Patent Number: 5,595,464
[45] Date of Patent: Jan. 21, 1997

[54] CRANK ADAPTER FOR A MILLING MACHINE

[76] Inventor: Warren H. Daniels, Jr., 416 Weatherly Dr., Durham, N.C. 27703

[21] Appl. No.: 416,343

[22] Filed: Apr. 4, 1995

[51] Int. Cl.⁶ .............................. B23C 9/00; B23B 47/18
[52] U.S. Cl. ........................ 409/219; 74/89.15; 409/159; 451/15
[58] Field of Search ..................... 409/219, 220, 409/162, 159, 164, 227, 145; 408/70; 451/5, 24, 15; 82/113, 128; 74/89.15, 424.8 A, 424.8 B; 474/84

[56] References Cited

U.S. PATENT DOCUMENTS

| | | | |
|---|---|---|---|
| 715,832 | 12/1902 | Meyer | 409/219 |
| 1,213,237 | 1/1917 | Newton et al. | 409/227 |
| 1,565,709 | 7/1922 | Burgh | 408/79 |
| 1,735,478 | 11/1929 | Stubbs | 408/64 |
| 1,986,602 | 1/1935 | Royle | 409/219 |
| 2,407,769 | 11/1943 | Anderson | 408/91 |
| 3,116,556 | 1/1964 | Nyberg et al. | 409/219 |
| 3,120,786 | 2/1964 | Schroeder | 409/219 |
| 4,086,730 | 5/1978 | Kobayashi et al. | 451/24 |
| 4,154,144 | 5/1979 | Lyman | 409/162 |
| 4,706,415 | 11/1987 | Okada et al. | 451/5 |

*Primary Examiner*—William R. Briggs
*Attorney, Agent, or Firm*—Olive & Olive, P.A.

[57] ABSTRACT

An improved crank adapter mounts on the end of a milling machine worktable and enables the operator to adjust the worktable lateral position with a forward facing crank. This relieves the need for the operator to reach past the worktable end and manipulate a sidewards facing crank. The crank adapter mechanism includes a bevel gear mounted on the end of the worktable lead screw which engages a second bevel gear driven by a forward facing crank. The crank adapter mechanism can be mounted on either or both ends of the worktable after removal of the existing end plate or end plates.

6 Claims, 5 Drawing Sheets

CRANK ADAPTER FOR A MILLING MACHINE

FIELD OF THE INVENTION

This invention relates to machine tools, and more particularly to vertical milling machines.

BACKGROUND OF THE INVENTION

Milling machines are very common pieces of equipment in a machine shop. A Bridgeport™ 3-Horsepower milling machine having a 10"×54" worktable is a typical example. Traditional milling machines have a worktable which can be moved in three dimensions. The vertical position of the worktable is generally set at a height that is appropriate for a particular workpiece and is changed less often than the worktable position in the two dimensions of the horizontal plane. All of the three dimensional position adjustments are made by the manipulation of cranks.

The worktable of a milling machine is comparatively long in the lateral direction (left-right) and short in the direction from the machine pedestal to the operator (in-out). When the milling machine worktable is centered in the lateral direction with respect to the machine pedestal, the distance from the center to the end of the worktable is about equal to the length of an average operator's arm. The two cranks which are used to move the table laterally are located on the lateral ends of the worktable, and are somewhat difficult for the operator to reach. When the worktable is moved out of center, one of the lateral movement cranks is farther from center and the other is closer; if the one which is farther is the one manipulated by the operator with his or her dominant hand, the difficulty of reach becomes troublesome.

Some milling machines have servomotors for driving the lateral table moving cranks. While helpful in many instances, a motorized control is less sensitive than a manual control and tends to be expensive.

Thus, a milling machine having at least one easily reached lateral movement crank would be a benefit to the machine user. In addition to improving newly produced milling machines, a retrofit adaptation would be equally useful because of the large number of milling machines in existence.

It is therefore an object of this invention to provide a milling machine with a crank for lateral movement of the machine table which resides within relatively easy reach of the machine operator.

It is a further object of this invention to provide an adapter to be added to an existing milling machine which will reposition at least one of the cranks for lateral movement of the machine table so that it is within relatively easy reach of the machine operator.

Other objects and advantages will be more fully apparent from the following disclosure and appended claims.

SUMMARY OF THE INVENTION

The invention provides a crank adapter mechanism to be built into new milling machines or installed on existing machines. The crank adapter of the invention has a first bevel gear mounted on an extended lateral-movement lead screw shaft and a second bevel gear mounted on a crank shaft so as to engage the first bevel gear. The bevel gears and shaft are enclosed in a housing which is mountable on the end of the milling machine worktable to replace the original worktable end plate. A crank wheel is mounted on an outer end of the crank shaft and resides parallel to the center line of the lead screw and is positioned on the operator side of the worktable.

DETAILED DESCRIPTION OF THE INVENTION

Figure 1:
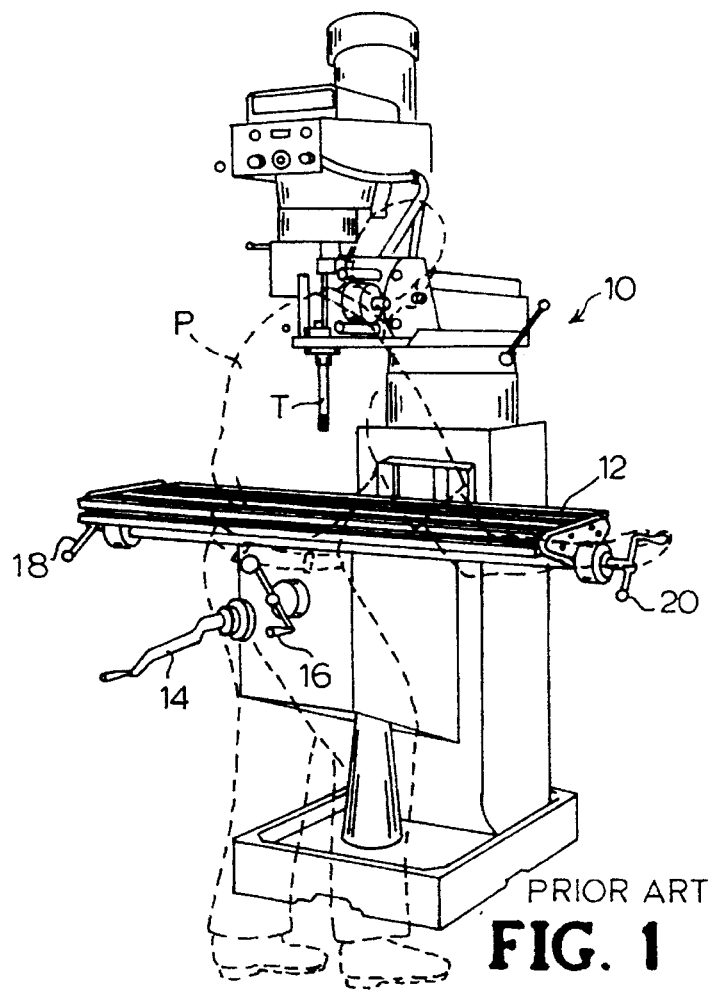
FIG. 1 is a perspective view of a typical prior art milling machine with an operator illustrated in dashed lines.

A typical milling machine 10, as is known in the prior art, is illustrated in FIG. 1 with an operator P in a working posture shown in dashed lines. Milling machine 10 has a worktable 12 which is adapted for securely anchoring a workpiece to it during machining operations. Since workpieces vary considerably in height, and the height of powered cutting tool T is fixed, milling machine worktable 12 is necessarily adjustable for height. This adjustment is accomplished by turning vertical lift crank 14.

Milling machine 10 is used to cut a workpiece by moving worktable 12 in various directions while the rotating cutting tool T remains in place. Worktable 12 is moved closer to and farther from operator P by means of in-out crank 16, which is positioned near the middle of worktable 12. Worktable 12 is moved laterally by means of left lateral movement crank 18 and right lateral movement crank 20 at either end thereof. Lead screw 26 (FIG. 2) extends between lateral cranks 18, 20 and operates in conjunction with a nut (not shown) fixed to the machine frame and through which screw 26 is threaded. As is seen in FIG. 1 and more clearly in top view in FIG. 2, right lateral movement crank 20 at the right end of worktable 12 is somewhat difficult for operator P to reach and manipulate when worktable 12 is right of center. This is particularly true when operator P is right-handed. A similar observation could be made if operator P is left-handed and attempting to reach crank 18 at the left end of the worktable. A dial gauge 22 is mounted on the end of lead screw 26.

Figure 2:
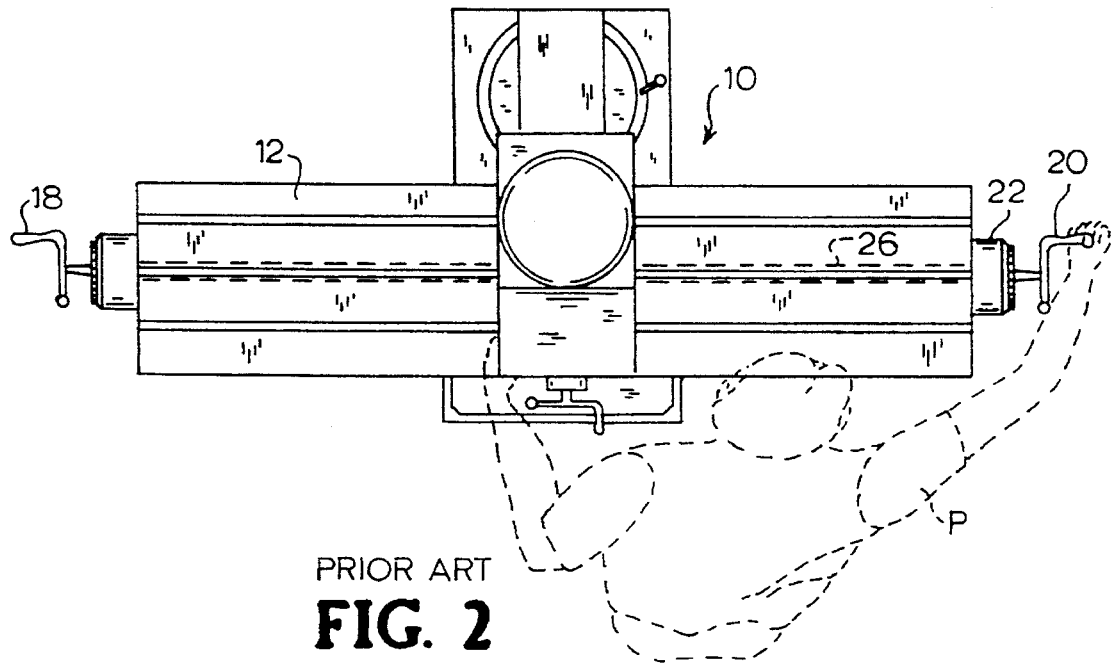
FIG. 2 is a top plan view of the milling machine of FIG. 1.
Figure 3:
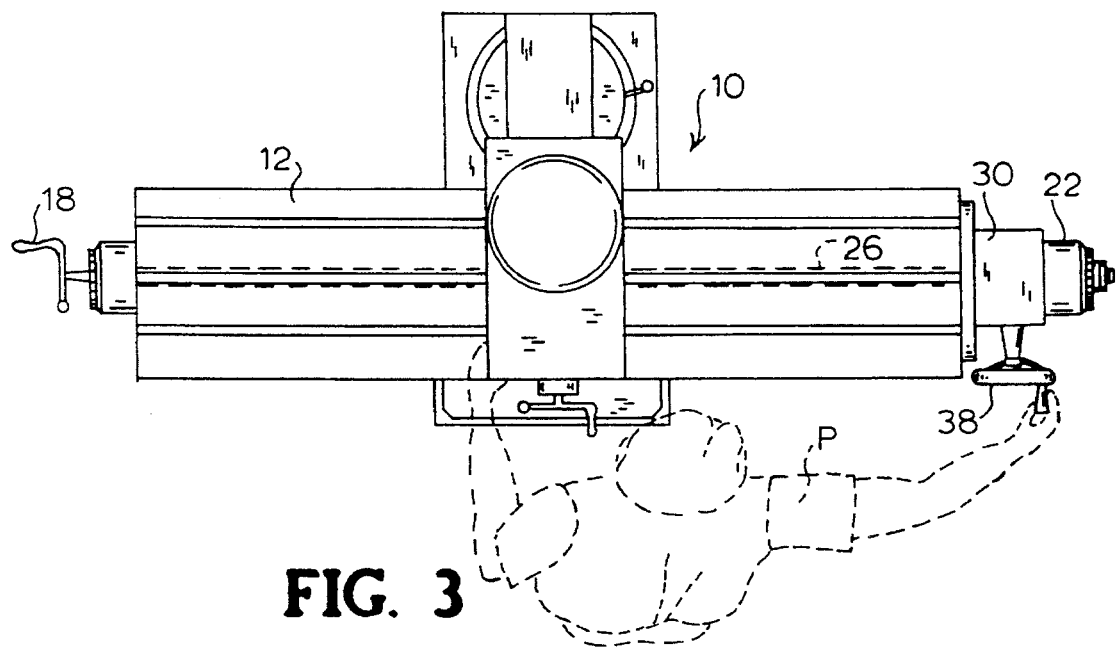
FIG. 3 is a top plan view of a milling machine fitted on the right end of the worktable with the easily reached crank adapter of the invention for lateral table movement.

FIG. 3 shows a similar view to that of FIG. 2, but with the milling machine 10 illustrated as having been fitted with a crank adapter 30 of the invention on the right end of the worktable 12 by way of example. Dial gage 22, as seen in FIG. 3, resides in a similar position to that of existing milling machines, but crank wheel 38 is seen as being closer to operator P (as compared to crank 20 of FIG. 1), since it is mounted on a shaft 40 (FIG. 6) which is perpendicular to lead screw 26. In addition to being closer to the place at which operator P stands, operator P is now able to manipulate crank wheel 38 without reaching around the end of worktable 12, as was necessary with the crank mechanisms shown in the illustration of FIG. 2.

Figure 4:
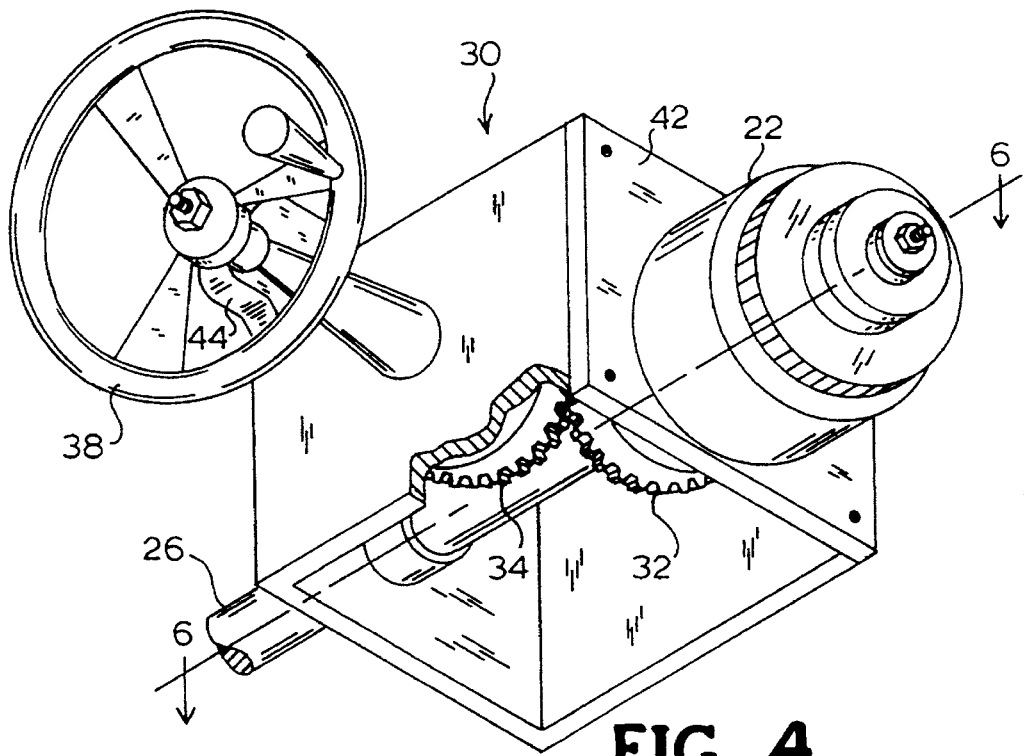
FIG. 4 is a perspective view of the crank adapter of the invention.

The principles of the crank adapter mechanism of the invention are illustrated in perspective in FIG. 4. Lead screw 26 extends beyond the end of worktable 12. In order to enable crank adapter 30 of the invention to be mounted, a shaft extension 46 (see FIGS. 5 and 9) is added to the end of lead screw 26. First bevel gear 32 is mounted on the extension of lead screw 26 and second bevel gear 34 is mounted on shaft 40 on which crank wheel 38 is also mounted. Bevel gears 32, 34 are fixedly mounted to their respective shafts with a key 41 (FIG. 6) and a set screw (not shown). While the preferred embodiment of the invention employs bevel gears of equal size, gears of different sizes could be used, thus resulting in a changed shaft rotational ratio. In addition, alternate gear configurations providing a 90° drive could be used. The present invention also takes note and advantage of the fact that the mounting holes used for mounting the lateral cranks are, in general, of a standard configuration. The mechanism of the invention crank adapter 30 is encased within housing 42, which is adapted to assemble to existing bolt holes H (see FIGS. 8, 10) on the end of worktable 12 after removing a standard end plate (not shown). Housing 42 comprises a vertical front wall and in perpendicular relation thereto at respective ends of the front wall opposed vertical rearwardly extending inner and outer end walls and joined to said end walls a top wall.

Figure 5:
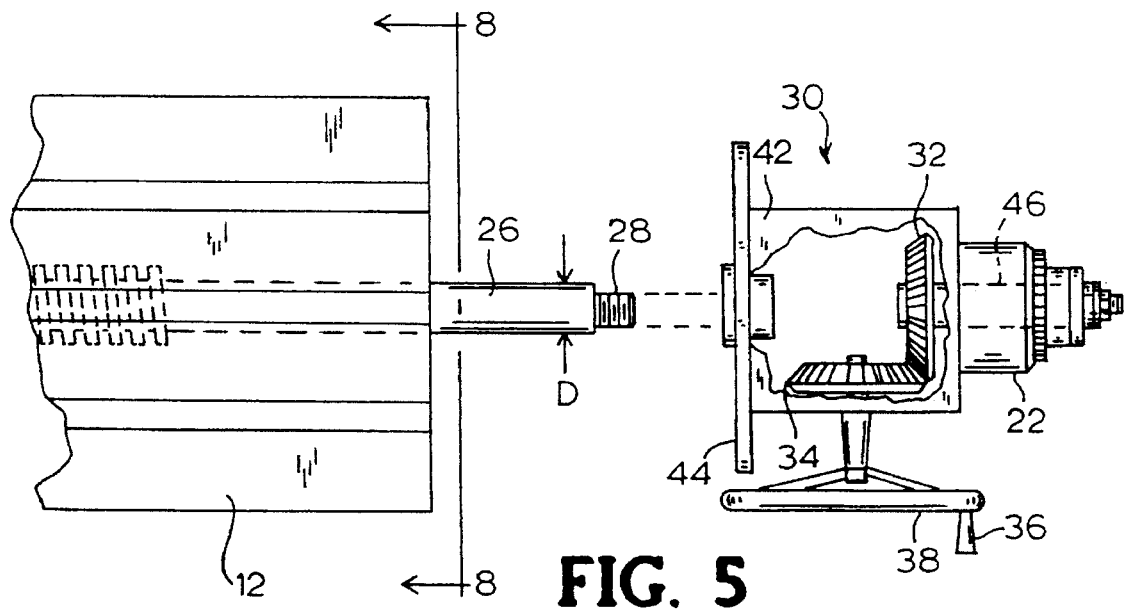
FIG. 5 is a top plan and exploded view of the right end of the worktable of an existing milling machine with the crank adapter of the invention ready to be mounted on the end of the lateral lead screw.
Figure 9:
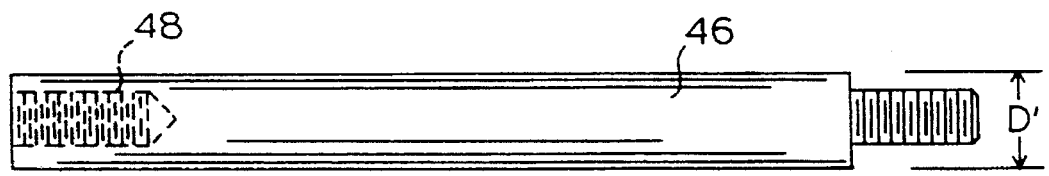
FIG. 9 is a side view of a shaft extension according to the invention.
Figure 8:
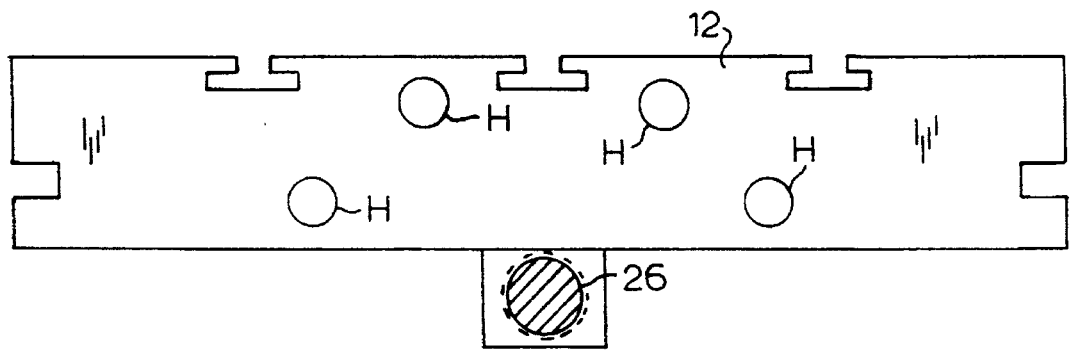
FIG. 8 is an end view of the worktable of a typical milling machine showing the pattern of mounting bolt holes available.
Figure 10:
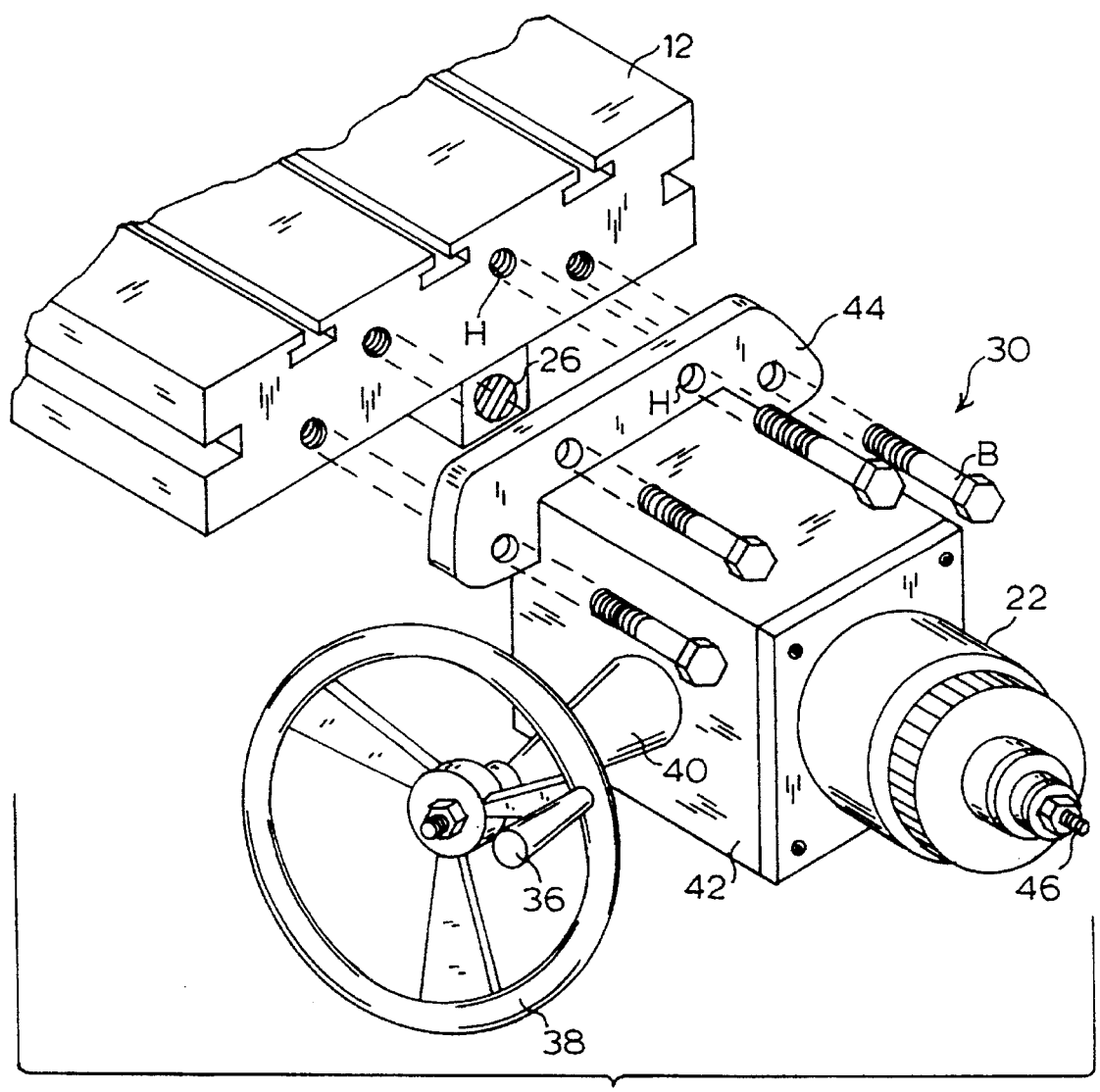
FIG. 10 is a perspective exploded view of the crank adapter of the invention in position to be assembled to the end of a milling machine worktable.

A cut-away view of crank adapter 30 is shown as a retrofit unit in FIG. 5 in position to be mounted onto the end of lead screw 26 and bolted to worktable 12. A detail of shaft extension 46 is shown in FIG. 9, wherein the diameter D' is substantially equal to the diameter D of lead screw 26 (FIG. 5). The end of lead screw 26 has a threaded portion 28 (FIG. 5), the diameter of which is less than diameter D and which mates with internal screw threads 48 (FIG. 9) of shaft extension 46. A taper pin or roll pin is pressed into a hole (not shown) drilled through shaft extension 46 and screw thread 28 after assembly. Alternatively, a chemical frictional agent, e.g. Loctite®, may be used. Appropriate bushings are provided to ensure shaft alignment and control friction during operation. End plate 44 is formed to assemble to the end of worktable 12 with matching bolt holes H and fasteners B as shown in FIG. 8. In the case where the crank adapter of the invention is incorporated in a new milling machine, a lead screw of sufficient length to avoid the need of a shaft extension is contemplated.

Figure 6:
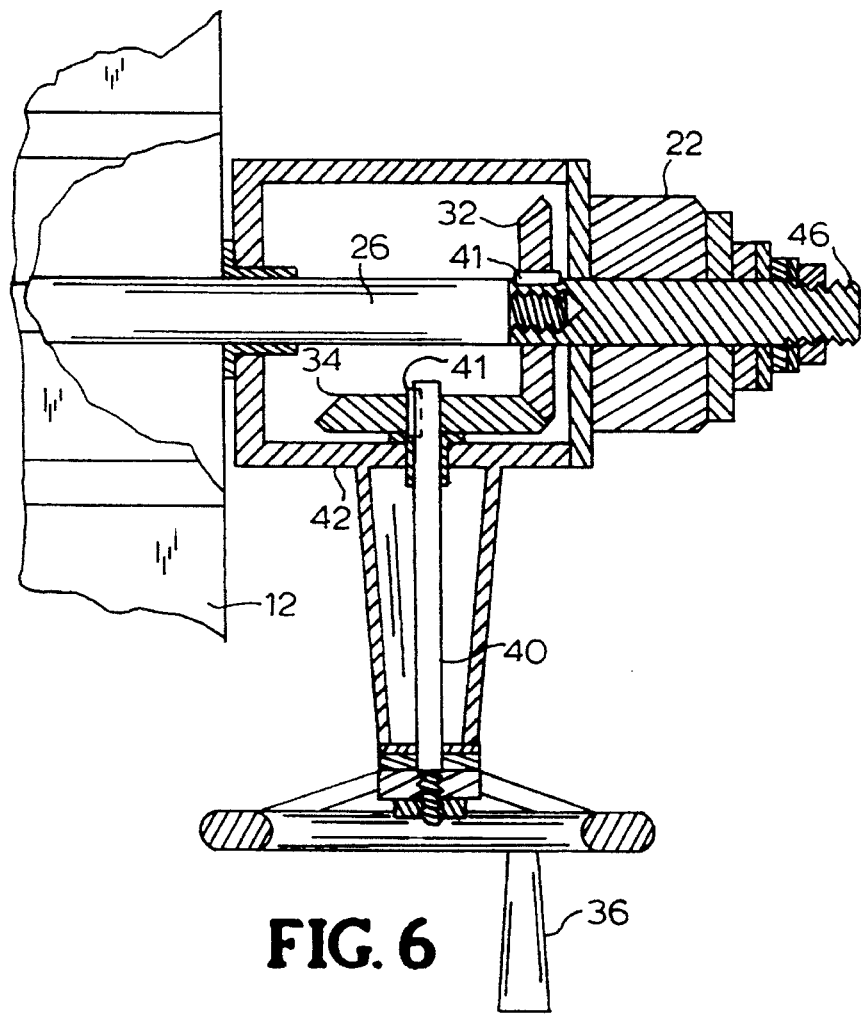
FIG. 6 is a cross sectional view of the crank adapter of the invention as taken in the direction of line 6—6 of FIG. 4.

The completed assembly according to the invention is shown in cross section in FIG. 6. Dial gauge 22 is mounted onto the end of shaft extension 46 and locked in place in similar manner to that done with dial gauge 22 on the end of lead screw 22 as in FIG. 2.

Figure 7:
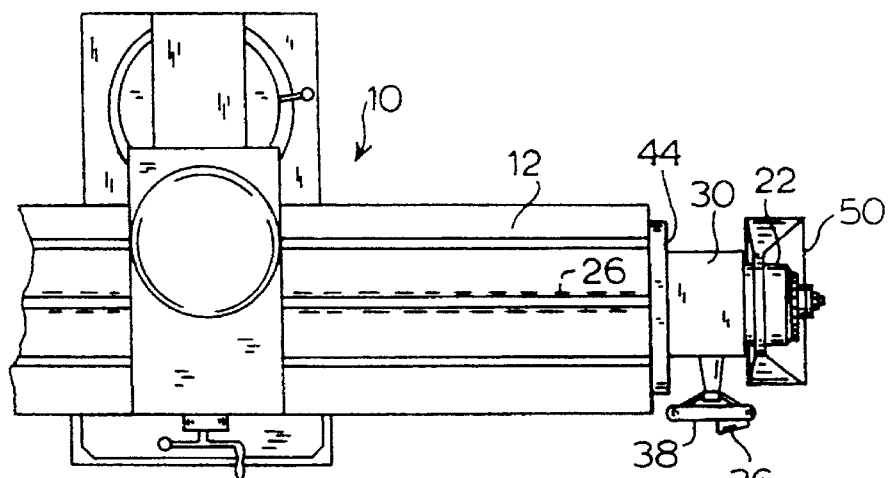
FIG. 7 is a top plan view of a milling machine fitted with both the crank adapter of the invention for lateral table movement and an interconnected servomotor.

The crank adapter 30 of the invention is configured to receive a suitable servomotor 50 with associated controls (not shown), as depicted in FIG. 7. For servomotor 50 to be assembled to crank adapter 30, an alternate end plate for housing 42 is substituted for the standard end plate. In this embodiment, dial gauge 22 mounts outward from servomotor 50 along shaft extension 46. This arrangement allows crank wheel 38 or servomotor 50 to be used interchangeably. Crank stem 36, which normally extends in a direction parallel to shaft 40 (FIGS. 5, 6), may be folded to lie perpendicular to shaft 40 (FIG. 7).

It is contemplated that the crank adapter of the invention may be built into a new milling machine or be provided as a separate retrofit unit to be added to a milling machine already in service. In the case of a replacement, the end plate of the worktable is removed and the retrofit unit bolted in its place. Further, the crank adapter of the invention may be made to fit either the left end or the right end of the milling machine worktable. Alternatively, the improved crank adapter of the invention may be installed on both the right and left ends of the worktable.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A crank adapter for retrofitting a milling machine having a worktable, a lead screw positioned below, lengthwise and outwardly of an end of the worktable, a base frame and means mounting said lead screw on said worktable, and said worktable and lead screw on said base frame in a manner enabling rotation of said lead screw to be translated into lateral motion of said worktable relative to said base frame, said crank adapter comprising:

(a) a housing having a vertical front wall and in perpendicular relation thereto at respective ends of said front wall opposed vertical rearwardly extending inner and outer end walls;

(b) a first shaft rotatably mounted in and passing through said outer end wall and adapted for being connected to said lead screw;

(c) a first gear mounted within said housing on said first shaft;

(d) a second shaft rotatably mounted in and passing through said front wall in perpendicular relation thereto;

(e) a second gear engaging said first gear and mounted within said housing on an inner portion of said second shaft;

(f) said inner end wall being formed with a lead screw receiving hole therethrough in alignment with said first shaft;

(g) means for securing said housing to an adjacent end of said worktable and enabling said first shaft to be connected to said lead screw; and (h) operator means mounted on an outer portion of said second shaft for rotating said second shaft to thereby enable said lead screw when connected to said first shaft to laterally move said worktable in a direction dependent on the direction of rotation of said second shaft.

2. The crank adapter according to claim 1 wherein said hole through said vertical front wall is sized to receive said lead screw therethrough and said first shaft is configured to engage said lead screw when said lead screw is positioned through said hole such that said second shaft and said lead screw operate integrally.

3. A crank adapter as claimed in claim 1 wherein said adjacent end of said worktable is formed with an array of internally threaded apertures and including a plate member rigidly secured to said housing inner end wall and formed with holes mating said threaded apertures and fasteners passing through said holes and received by said threaded apertures for securing said housing to said adjacent end of said worktable.

4. A crank adapter as claimed in claim 1 wherein said milling machine includes a dial gauge mounted on an outer end of said lead screw adjacent said worktable, said first shaft having an outer end extending outwardly of said outer end wall and adapted to mount said dial gauge thereon.

5. The crank adapter for lateral movement of a worktable of a milling machine as claimed in claim 1, wherein said means for rotating said rotatable shaft comprises a crank wheel fixedly mounted on said rotatable shaft and oriented in a vertical plane substantially parallel to said lead screw.

6. A milling machine having a worktable, a lead screw positioned below, lengthwise and outwardly of an end of the worktable, a base frame and means mounting said lead screw on said worktable, and said worktable and lead screw on said base frame in a manner enabling rotation of said lead screw to be translated into lateral motion of said worktable relative to said base frame, said milling machine further comprising:

(a) a housing having a vertical front wall and in perpendicular relation thereto at respective inner and outer ends of said front wall opposed vertical rearwardly extending inner and outer end walls;

(b) a first shaft rotatably mounted in and passing through said outer end wall and adapted for being connected to said lead screw;

(c) a first gear mounted within said housing on said first shaft;

(d) a second shaft rotatably mounted in and passing through said front wall in perpendicular relation thereto;

(e) a second gear engaging said first gear and mounted within said housing on an inner portion of said second shaft;

(f) said inner end wall being formed with a hole aligned with said first shaft and through which said lead screw is connected to said first shaft;

(g) said housing being secured to an adjacent end of said worktable; and (h) a crank wheel mounted on an outer portion of said second shaft for rotating said second shaft to thereby rotate said lead screw so as to laterally move said worktable in a direction dependent on the direction of rotation of said crank wheel.

* * * * *